No. 848,992.  
PATENTED APR. 2, 1907.

H. G. HEWITT.  
PENNY COLLECTOR.  
APPLICATION FILED AUG. 16, 1906.

Witnesses  
T. P. Britt  
C. G. Whitcomb

Inventor  
H. G. Hewitt  
By Swift &C.  
Attorneys

UNITED STATES PATENT OFFICE.

HARMON G. HEWITT, OF GEORGETOWN, ILLINOIS.

PENNY-COLLECTOR.

No. 848,992.

Specification of Letters Patent.

Patented April 2, 1907.

Application filed August 16, 1906. Serial No. 330,897.

*To all whom it may concern:*

Be it known that I, HARMON G. HEWITT, a citizen of the United States, residing at Georgetown, in the county of Vermilion and State of Illinois, have invented a new and useful Penny-Collector; and I do hereby declare the following to be a full, clear, and exact description of the invention, such as will enable others skilled in the art to which it appertains to make and use the same.
The invention relates to rural-mail-box penny-collectors, and has for its object to provide an ejector whereby the carrier can press a lever and eject all the pennies that have been deposited for him with which to buy postage for mailing letters for patrons along his route.

Figure 1:
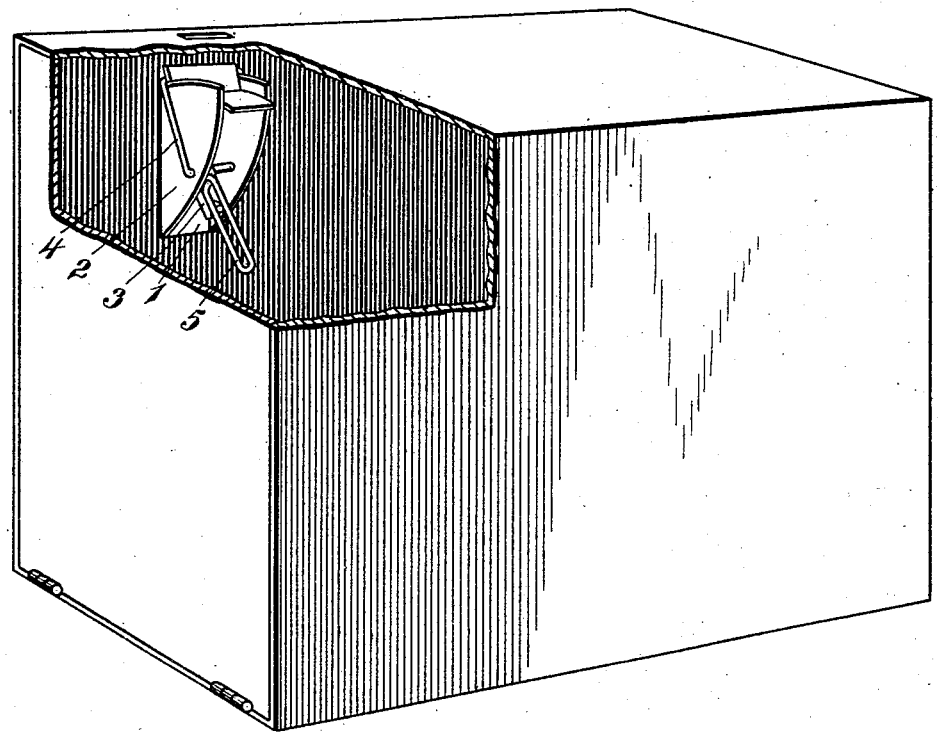
Figure 2:
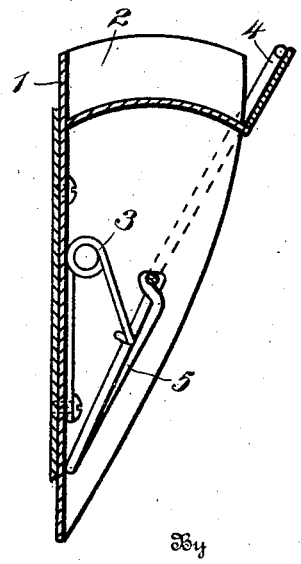

Another object of the invention is to provide a penny-collector for mail-boxes in which the penny or pennies will fall upon a rounded surface instead of a flat one, whereby when the lever is pressed the pennies will be readily thrust forward, even though they may have been frozen to the collector, as it is well known that rural carriers sometimes have to stop and use their pocket-knives to dig the pennies out of these penny-collectors, which causes a great amount of delay in cold weather.
With these and other objects in view the invention consists in the novel construction and arrangement of parts hereinafter described and shown, and particularly pointed out in the appended claim.
In the drawings, Figure 1 is a perspective view of a penny-ejector constructed in accordance with this invention. Fig. 2 is a vertical sectional view.

Referring to the drawings, 1 designates the back of the ejector, which is secured to the mail-box, preferably by screws. The sides 2 serve as a fulcrum for the ejecting-lever, which is held in normal position by a spring 3. The ejecting-lever 4 is provided with a thumb-piece or handle 5, which is pressed inwardly for the purpose of ejecting the pennies. The lever 4 is preferably made of stout wire, but may be made of other suitable material, and the upper end is provided with suitable webbing which forces the collected pennies outward, where they collectively fall into the hand of the carrier, thus saving him much time in picking them up one by one, and which when the weather is cold and the hands are chilled the saving in time is very considerable.

In practice this device is mounted on the interior of the mail-box, and when the door thereof is opened the pennies that have been deposited will be found collected in this device in the path of the lever, where they are readily collected by pressing the same. The entire device is of course mounted on the inside of letter-box.

What I claim is—

A device of the class described, comprising a mail-box having an opening therein, a rounded surface arranged beneath said opening, and a spring-actuated lever adapted to sweep said surface, substantially as and for the purpose described.

In testimony whereof I have signed my name to this specification in the presence of two subscribing witnesses.

HARMON G. HEWITT.

Witnesses:
C. E. AKERS,
CLAYTON NEWLIN.